H. PEARSON.
SIX WHEEL CAR TRUCK.
APPLICATION FILED DEC. 9, 1910.
1,017,312.
Patented Feb. 13, 1912.
4 SHEETS—SHEET 1.
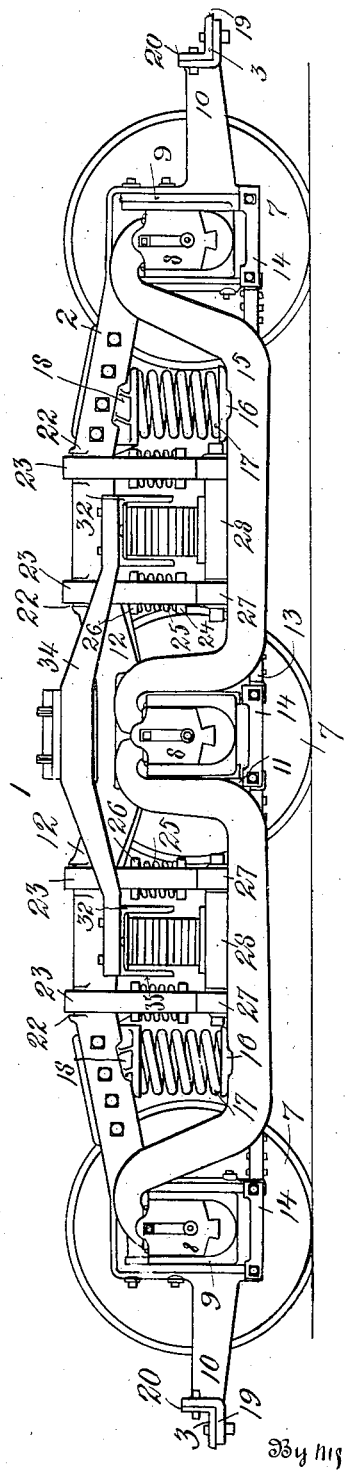
Witnesses:
Inventor
Henry Pearson,
By his Attorney

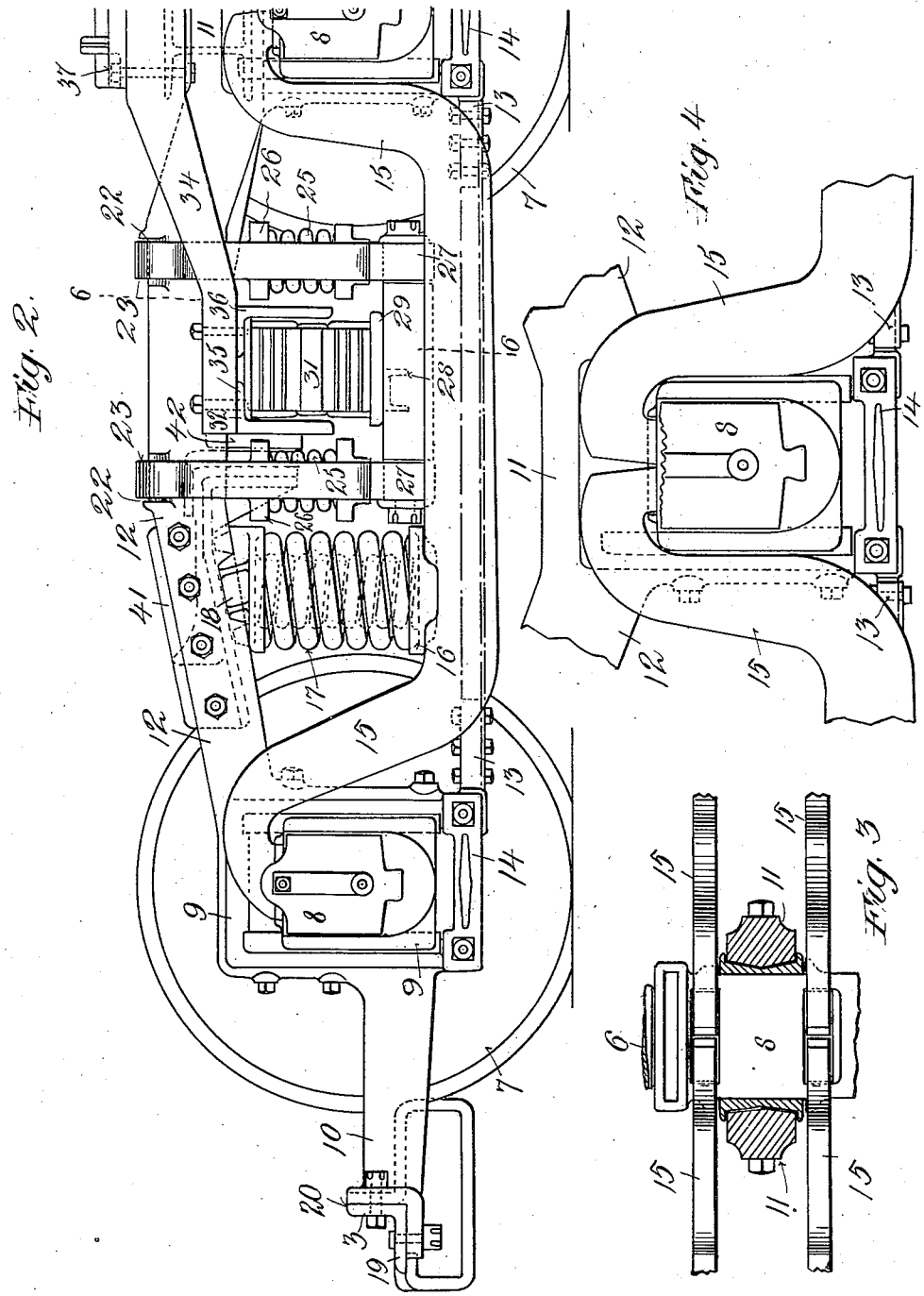

H. PEARSON.
SIX WHEEL CAR TRUCK.
APPLICATION FILED DEC. 9, 1910.
1,017,312.
Patented Feb. 13, 1912.
4 SHEETS—SHEET 3.
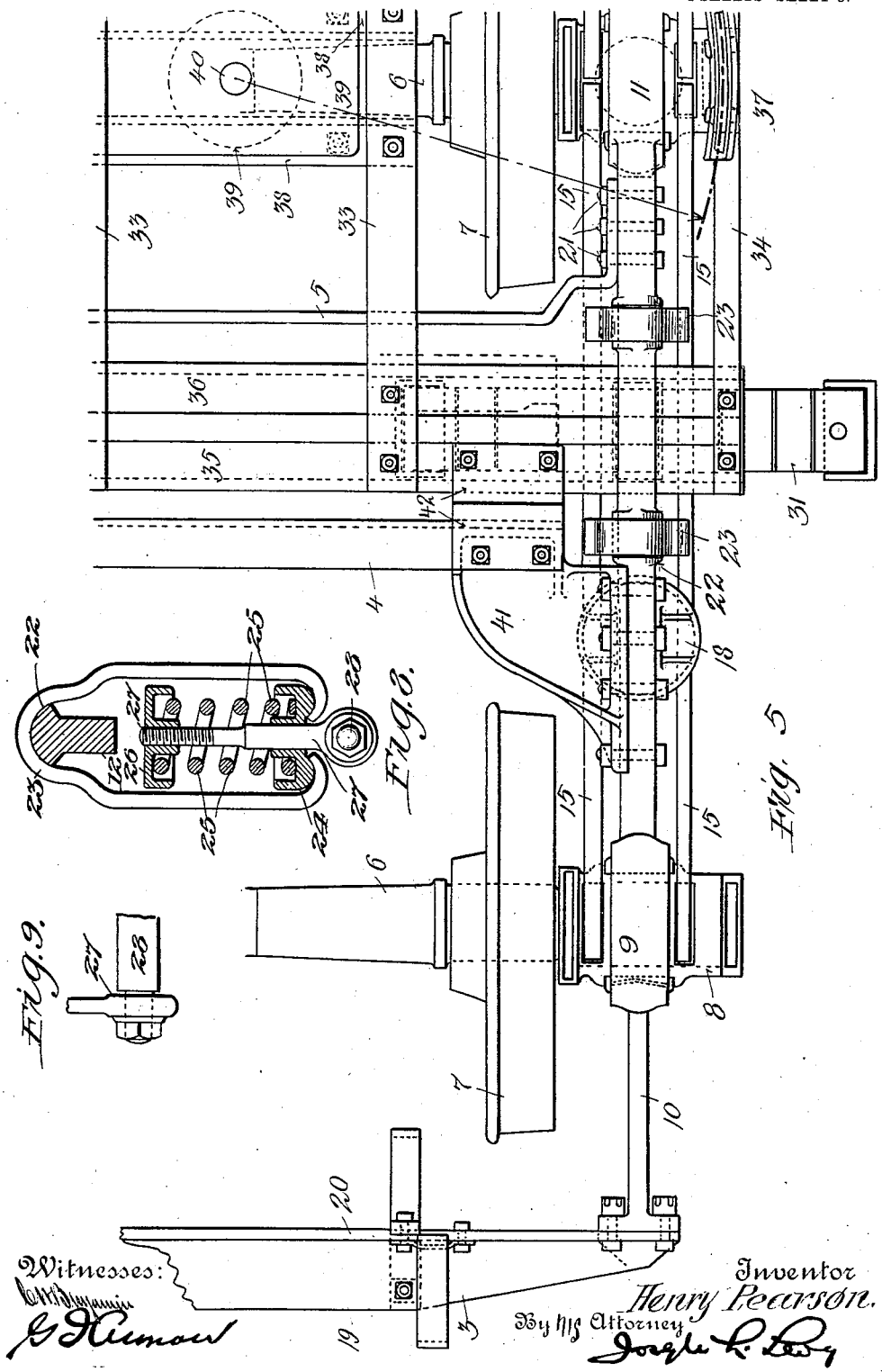

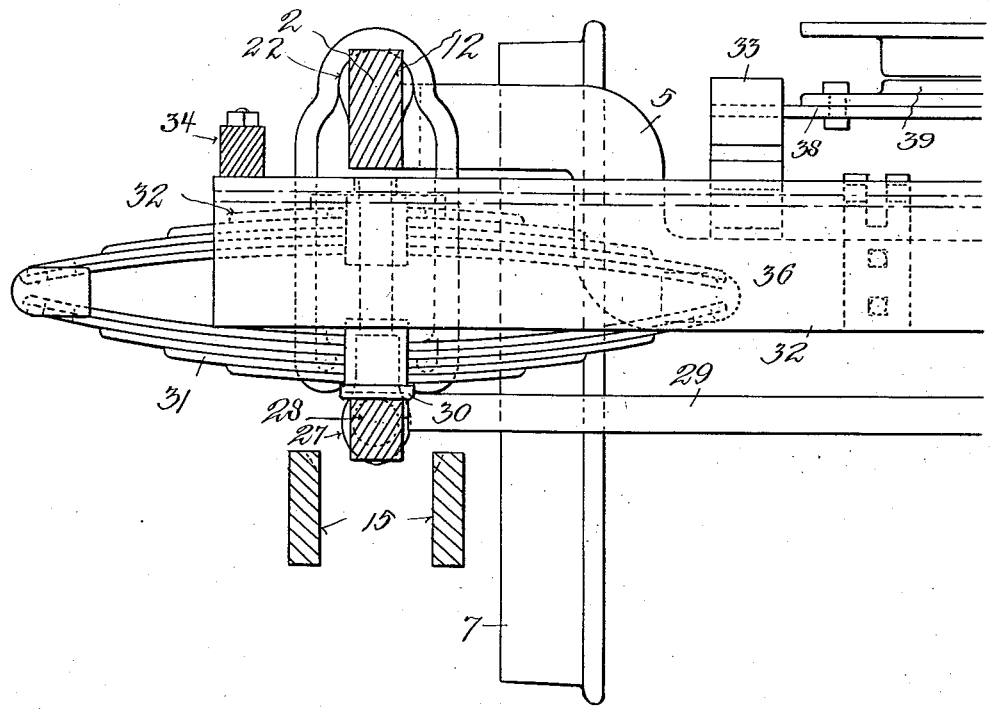
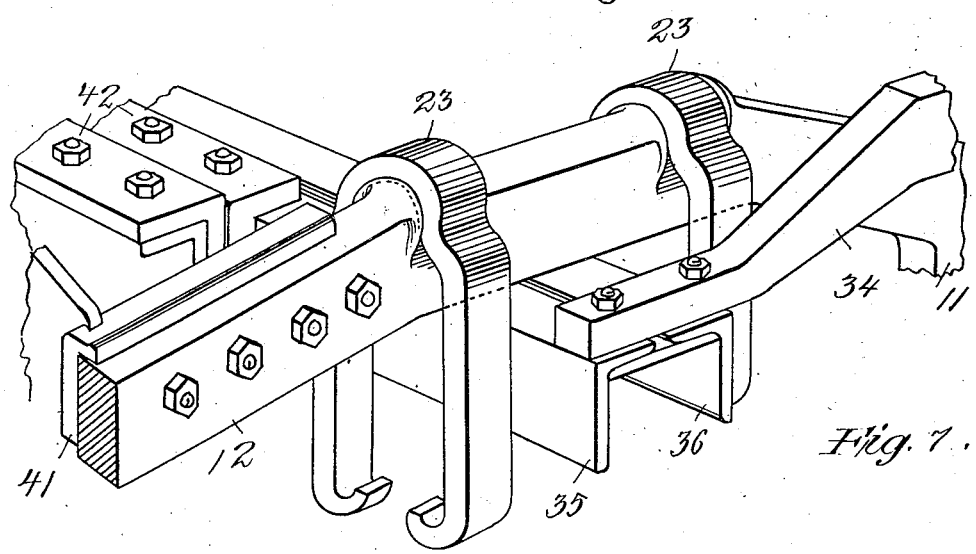

UNITED STATES PATENT OFFICE.

HENRY PEARSON, OF SPRINGFIELD, MASSACHUSETTS, ASSIGNOR TO J. G. BRILL COMPANY, OF PHILADELPHIA, PENNSYLVANIA, A CORPORATION OF PENNSYLVANIA.

SIX-WHEEL CAR-TRUCK.

1,017,312. Specification of Letters Patent. Patented Feb. 13, 1912.

Application filed December 9, 1910. Serial No. 596,413.

*To all whom it may concern:*

Be it known that I, HENRY PEARSON, a citizen of the United States, and a resident of Springfield, county of Hampden, and State of Massachusetts, (whose post-office address is 578 North Main street, in said city,) have invented a new and useful Improvement in Six-Wheel Car-Trucks, of which the following is a specification.

The object of my invention is to provide a truck of this class which will be simple in construction and durable and efficient in operation, which object is accomplished by my invention, one embodiment of which is hereinafter set forth.

For a more particular description of my invention, reference is to be had to the accompanying drawings, forming a part hereof, in which:

Figure 1 is a side elevation of a truck embodying my invention. Fig. 2 is an enlarged side elevation of half of the same. Figs. 3 and 4 are detailed views showing the central axle box of portions of the equalizing bars. Fig. 5 is a plan view of the structure shown in Fig. 2. Fig. 6 is a sectional view taken on the line 6—6 of Fig. 2, looking in the direction of the arrows. Fig. 7 is a perspective view of a portion of the truck frame. Figs. 8 and 9 are detailed views showing a stirrup and connecting parts, Fig. 8 being a sectional view, and Fig. 9 a view which shows a bar and the eye-bolt which supports one end of the same.

Throughout the various views of the drawings similar reference characters designate similar parts.

My improved truck 1 is provided with suitable side frames 2 which are united at their ends by crossings 3 and intermediate of their ends by suitable transoms 4 and intermediate crossings 5. This truck is also provided with the usual axles 6, three in number, wheels 7, and axle boxes 8, to correspond. The end axle boxes move in suitable pedestals 9 which have extensions 10 running therefrom to which are secured the crossings 3. The center pedestals 11 have laterally extended top chords 12 which are first upwardly arched and then run horizontally and then bent downwardly and run to the pedestals 9 whereby a strong and efficient side frame is formed. The lower ends of the pedestals 11 and 9 are also connected by means of suitable tie rods 13 and each pedestal has its lower jaws closed by bars 14. The tie bars 13 and bars 14 are held by suitable bolts or in any other desired manner. The axle boxes 8 extend beyond the pedestals and on each side thereof so as to support the equalizing bars 15 in the conventional manner. Two sets of parallel equalizing bars are employed, one on each side of each side frame 2. These equalizing bars 15 carry spring seats 16 and on these are mounted the equalizing springs 17 which are surmounted by caps 18 which bear under the top chords 12 and support the same. These equalizing springs 17 are so placed that the load is equally distributed between the three axles, that is the distance from each spring 17 to the end axle boxes is one-half of the distance to the central axle box.

The crossings 3 are the usual form and are preferably provided with a horizontal web 19 and a vertical web 20, both webs being secured to the arm 10 by bolts or other suitable means.

The crossings 5 have their ends bent parallel to top chords 12 and are fixed thereto by bolts 21. These crossings 5 are also suitably bent so as to avoid the wheels and so as not to interfere with the bars which support the bolsters which will be described below. These bars 5 can, if desired, carry a part of the brake mechanism.

The horizontal portion of the top chords 12 are provided with suitable seats 22 on which are mounted the stirrups 23 which hang from said chords and at their lower ends are upwardly bent to receive cups 24 on which are placed coiled springs 25 which have caps 26 which are fixed to rods 27 that run through coiled springs 25 and the seats 24. The lower ends of the rods 27 are united by a suitable bar 28 held by bolts or otherwise and fitting in the bars 27 with a pivoted connection. A spring plank 29 connects these bars 28 and rests thereon and causes said bars to swing together. The bars 28 also carry seats 30 for elliptical springs 31 and these elliptical springs carry spring bolsters 32 in the conventional manner which bolsters rest between the transoms 4, each bolster against one transom, and the bolsters 32 are united by center bearing arched bars 33 and side bearing arched bars 34 which are fixed thereto by bolts. Each bolster 32 is preferably composed of two angle bars 35 and 36, are secured together by the arch bars 33 and 34 or in any other suitable manner as well as by the caps of the springs 31.

The side bearing arch bars 34 are each provided with suitable rub plates 37 bolted thereon and so shaped as to be concentric with king bolt of the truck.

The center bearing arched bars 33 are, near their centers, united by the center bearing bars 38 which carries the center bearing 39 with its rub plates and central perforation 40 which is adapted to receive a king bolt in the conventional manner.

The transoms 4 are preferably of angle metal and are supported by suitable brackets 41 fixed to the top chords 12. The bars 35 of the bolsters 32 and the transoms 4 are preferably provided with suitable rub plates 42 made of angle metal and fixed in place by bolts or other suitable means.

In view of the foregoing, the operation of my improved truck will be readily understood. The load is carried principally by the center bearing and also by the side bearings and truck turns on the king bolt which passes through the perforation 40. The center and side bearing arch bars 33 and 34 transmit the load to the bolsters 32 which compress the springs 31 and the springs pass the load through the seats 30 to the bars 28 whence it is carried through the bars 27, caps 26, springs 25 and seats 24 to the stirrup 23 from whence it is distributed over the top chords 12 which in turn transmit the load evenly to the equalizing springs 17 and from these through the equalizing bars 15 to the axle boxes 8. The distribution of the load is the same regardless of what it may be, provided that it is within the capacity of the truck.

While I have shown and described one embodiment of my invention, it is obvious that it is not restricted thereto, but is broad enough to cover all structures that come within the scope of the annexed claims.

What I claim is:

1. In a truck of the class described, a center axle and an axle on each side thereof, journal boxes on said axles, side frames carried by said axle boxes, equalizing bars resting on said axle boxes, springs between said equalizing bars and the top chords of said side frames, stirrups suspended from said top chords, springs carried by said stirrups, horizontally disposed bars and means for supporting the same from said last-mentioned springs, springs carried by said bars, bolsters carried by said springs, arched bars carried by said bolsters carrying center and side bearings and transoms and crossings uniting said side frames.

2. In a truck of the class described center and end wheels and axles, journaled boxes on said axles, side frames supported by equalizing springs on equalizing bars, said bars resting on said axle boxes, stirrups hung from the top chord of said side frames, springs carried by said stirrups, horizontally disposed bars supported by said springs, elliptical springs carried by said horizontally disposed bars, bolsters supported by said elliptical springs, upwardly arched side and center bearing bars carried by said bolsters, side and center bearings carried by said bars, transoms with rub plates limiting the movement of said bolsters and crossings uniting said side frames.

Signed at the city of Philadelphia, county of Philadelphia, and State of Pennsylvania, this 2nd day of December, 1910.

HENRY PEARSON.

Witnesses:
HARRY F. MCKILLIP,
HENRY C. ESLING.